(12) United States Patent
Hu et al.

(10) Patent No.: US 12,293,027 B2
(45) Date of Patent: May 6, 2025

(54) METHOD FOR OPERATING AN APPLIANCE USING HAND GESTURES

(71) Applicant: Haier US Appliance Solutions, Inc., Wilmington, DE (US)

(72) Inventors: Haitian Hu, Louisville, KY (US); Adam Hofmann, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/450,153

(22) Filed: Aug. 15, 2023

(65) Prior Publication Data

US 2025/0060828 A1 Feb. 20, 2025

(51) Int. Cl.
*G06F 3/01* (2006.01)
*G06V 10/82* (2022.01)
*G06V 40/20* (2022.01)
*H04L 12/28* (2006.01)

(52) U.S. Cl.
CPC .............. *G06F 3/017* (2013.01); *G06V 10/82* (2022.01); *G06V 40/28* (2022.01); *H04L 12/282* (2013.01); *H04L 12/2825* (2013.01)

(58) Field of Classification Search
CPC ... G06F 3/048–05; G06F 3/017; G06V 40/28; H04L 12/282
See application file for complete search history.

(56) References Cited

U.S. PATENT DOCUMENTS

| | | | |
|---|---|---|---|
| 8,863,040 B2 | 10/2014 | Queru | |
| 10,662,571 B2 | 5/2020 | Strahle | |
| 11,093,554 B2 | 8/2021 | Rexach et al. | |
| 2008/0019569 A1* | 1/2008 | Rhoads | G06F 3/017 382/107 |
| 2012/0235899 A1* | 9/2012 | Han | G06V 40/28 345/156 |
| 2013/0088428 A1* | 4/2013 | Ting | G06F 3/04847 345/157 |
| 2013/0139071 A1* | 5/2013 | Hoff | G06F 16/44 715/756 |
| 2013/0170699 A1* | 7/2013 | Bran | G06F 3/017 382/103 |
| 2013/0229346 A1* | 9/2013 | Jungbauer | G06F 3/0304 345/158 |
| 2013/0307765 A1* | 11/2013 | Li | G06F 3/017 345/156 |
| 2014/0157209 A1* | 6/2014 | Dalal | G06F 3/012 715/863 |

(Continued)

FOREIGN PATENT DOCUMENTS

| | | |
|---|---|---|
| CN | 108542332 A | 9/2018 |
| CN | 108888224 A | 11/2018 |

(Continued)

*Primary Examiner* — Daniel Rodriguez
(74) *Attorney, Agent, or Firm* — Dority & Manning, P.A.

(57) ABSTRACT

A method of using a remote server to operate a first appliance of a plurality of appliances connected to an external network includes receiving one or more images from a second appliance of the plurality of appliances, analyzing the one or more images to detect a hand gesture, identifying a responsive action associated with the hand gesture, and instructing the first appliance to implement the responsive action.

20 Claims, 3 Drawing Sheets

(56) References Cited

U.S. PATENT DOCUMENTS

| | | | | |
|---|---|---|---|---|
| 2014/0310764 | A1* | 10/2014 | Tippett | G06F 21/31 |
| | | | | 726/1 |
| 2015/0000025 | A1* | 1/2015 | clements | G06F 3/041 |
| | | | | 4/443 |
| 2016/0364008 | A1* | 12/2016 | Chun | G02B 27/01 |
| 2017/0220128 | A1* | 8/2017 | Karmon | G06F 3/0208 |
| 2018/0020350 | A1* | 1/2018 | Vissa | G06F 1/1698 |
| 2018/0342151 | A1* | 11/2018 | VanBlon | G06F 3/011 |
| 2019/0384389 | A1* | 12/2019 | Kim | G06F 3/017 |
| 2019/0391666 | A1* | 12/2019 | Kim | G06N 3/08 |
| 2020/0050259 | A1* | 2/2020 | Lam | F26B 25/12 |
| 2020/0110928 | A1* | 4/2020 | Al Jazaery | G05B 19/042 |
| 2020/0134341 | A1* | 4/2020 | Hu | G06V 40/113 |
| 2021/0041956 | A1* | 2/2021 | Hasburgh | G06F 3/017 |
| 2021/0152389 | A1* | 5/2021 | Park | G06F 18/2413 |
| 2021/0201661 | A1* | 7/2021 | Al Jazaery | G08C 23/00 |
| 2021/0262725 | A1* | 8/2021 | Hong | F25D 25/00 |
| 2021/0272362 | A1* | 9/2021 | Park | H04L 12/282 |
| 2021/0329073 | A1 | 10/2021 | Sharma et al. | |
| 2021/0348828 | A1* | 11/2021 | Shin | F25D 23/02 |
| 2022/0409005 | A1* | 12/2022 | Gross | A47L 15/26 |
| 2022/0412640 | A1* | 12/2022 | Lee | G06V 20/68 |
| 2023/0299997 | A1* | 9/2023 | Hu | G06V 40/10 |
| | | | | 700/17 |
| 2024/0015045 | A1* | 1/2024 | King | H04L 12/282 |
| 2024/0296697 | A1* | 9/2024 | Xu | G06F 1/163 |

FOREIGN PATENT DOCUMENTS

| | | |
|---|---|---|
| CN | 105095882 B | 3/2019 |
| CN | 108038452 B | 11/2020 |
| DE | 102014115460 A1 | 4/2016 |
| EP | 3884212 B1 | 6/2023 |

* cited by examiner

METHOD FOR OPERATING AN APPLIANCE USING HAND GESTURES

FIELD OF THE INVENTION

The present subject matter relates generally to appliances, and more particularly to methods for using hand gesture detection to operate appliances.

BACKGROUND OF THE INVENTION

Conventional appliances include user interface panels where a user may interact with the appliance. For example, dishwasher appliances include user interface panels where a user can make cycle selections, adjust operating parameters, and initiate operating cycles of the dishwasher appliance. However, these user interface panels may frequently be mounted at locations that are difficult to access, particularly with dishwashers, e.g., due to their unique mounting location. In this regard, dishwashers are typically installed under the counter in the kitchen, making it difficult to see the user interface panel from a standing position.

In addition, dishwashers have limited surface area for placing large user interface panels, unlike refrigerators and ovens, which can accommodate bigger screens without hindering their functionality. Consequently, manufacturers of dishwashers may be forced to squeeze many options into a limited space, making it overwhelming for many users to navigate. Moreover, frequent use of physical user interface panels of dishwashers with dirty or wet hands can pose a risk of causing electrical and mechanical breakdowns of the user interface panel.

Accordingly, a dishwasher appliance with an improved method for user interaction is desired. More specifically, a method for operating a dishwasher appliance that permits simplified user input would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a method of using a remote server to operate a first appliance of a plurality of appliances is provided. The method includes receiving one or more images from a second appliance of the plurality of appliances, analyzing the one or more images to detect a hand gesture, identifying a responsive action associated with the hand gesture, and instructing the first appliance to implement the responsive action.

In another exemplary embodiment, a method for operating an appliance is provided including obtaining one or more images using a camera assembly, analyzing the one or more images to detect a hand gesture, identifying a responsive action associated with the hand gesture, and implementing the responsive action using the appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
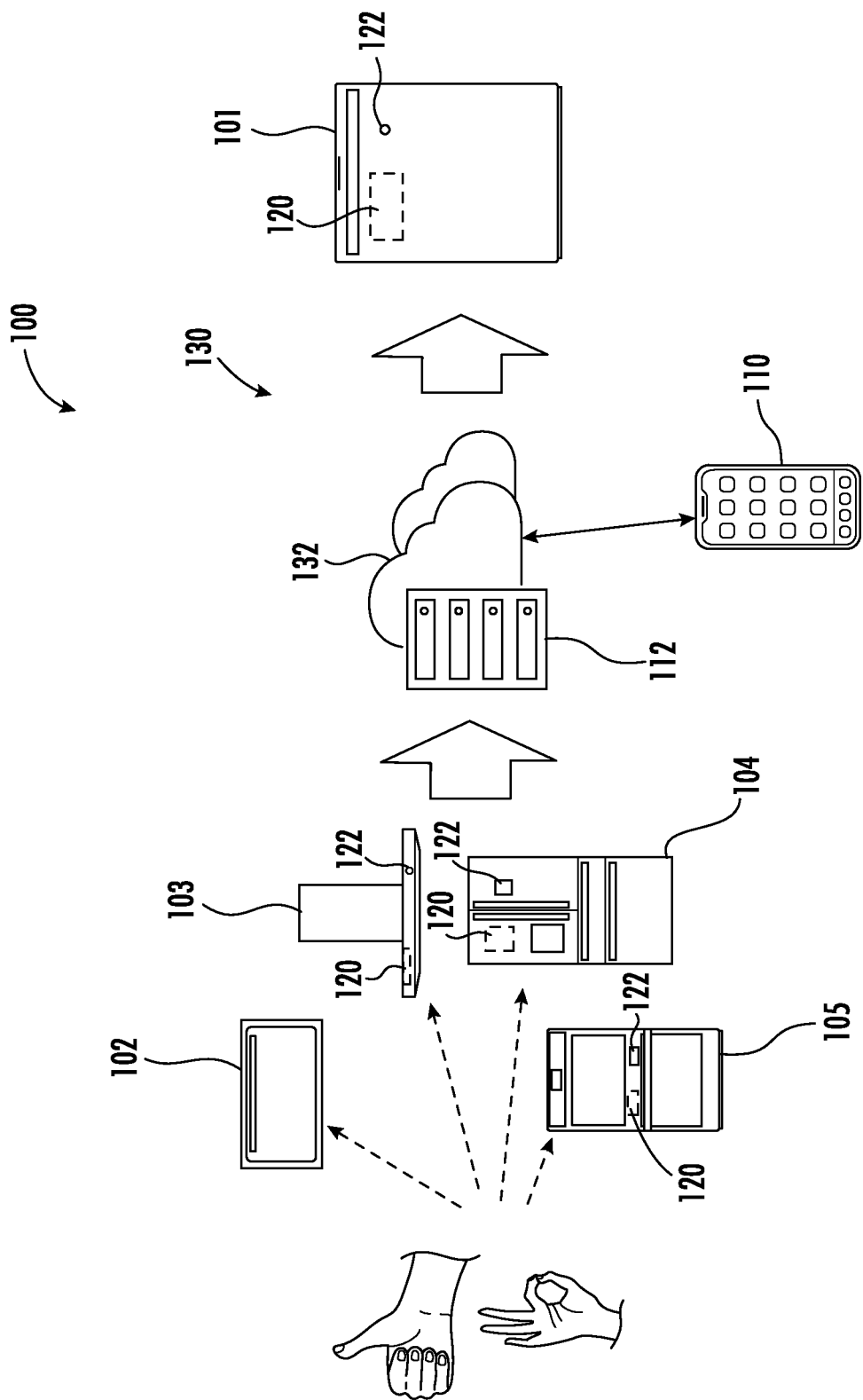
FIG. 1 provides a schematic view of a plurality of appliances connected to a remote server through an external network according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
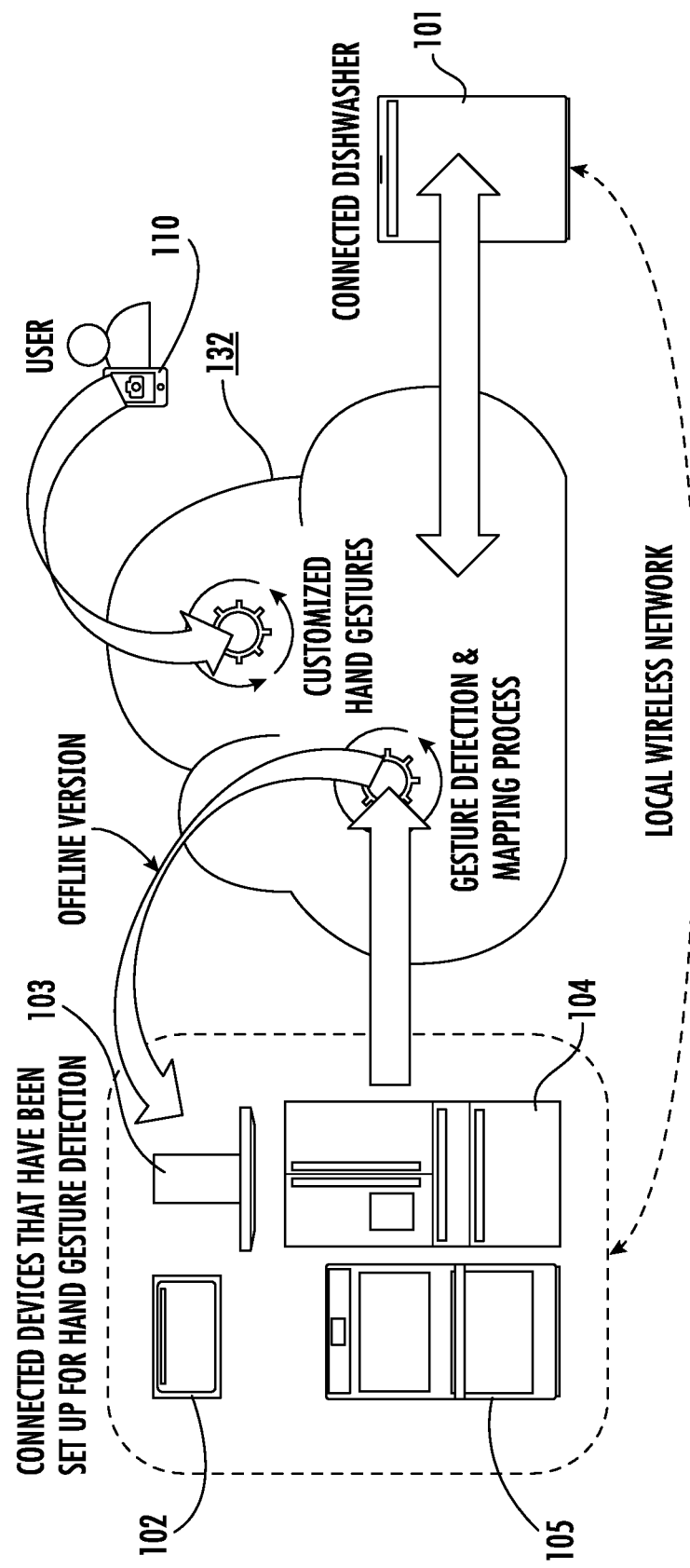
FIG. 2 provides a schematic view of a process for operating an appliance using hand gestures according to an example embodiment of the present subject matter.

Referring now to FIGS. 1 and 2, a system of appliances 100 will be described according to exemplary embodiments of the present subject matter. In general, system of appliances 100 may include any suitable number, type, and configuration of appliances, remote servers, network devices, and/or other external devices. Some of these appliances 100 may be able to communicate with each other or are otherwise interconnected. This interconnection, interlinking, and interoperability of multiple appliances and/or devices may commonly be referred to as "smart home" or "connected home" appliance interconnectivity.

FIGS. 1 and 2 illustrate system of appliances 100 according to exemplary embodiments of the present subject matter. As shown, system of appliances 100 generally includes a first appliance 101 (e.g., illustrated herein as a dishwasher appliance), a second appliance 102 (e.g., illustrated herein as a microwave appliance), a third appliance 103 (e.g., illustrated herein as a vent hood), a fourth appliance 104 (e.g., illustrated herein as a refrigerator appliance), and a fifth appliance 105 (e.g., illustrated herein as an oven appliance). Details regarding the operation of appliances 101-105 may be understood by one having ordinary skill in the art and detailed discussion is omitted herein for brevity. However, it should be appreciated that the specific appliance types and configurations are only exemplary and are provided to facilitate discussion regarding the use and operation of an exemplary system of appliances 100. The scope of the present subject matter is not limited to the number, type, and configurations of appliances set forth herein.

For example, the system of appliances 100 may include any suitable number and type of "appliances," such as "household appliances." These terms are used herein to describe appliances typically used or intended for common domestic tasks, e.g., such as the appliances as illustrated in the figures. According to still other embodiments, these "appliances" may include but are not limited to a refrigerator, a dishwasher, a microwave oven, a cooktop, an oven, a washing machine, a dryer, a water heater, a water filter or purifier, an air conditioner, a space heater, and any other household appliance which performs similar functions. Moreover, although only five appliances are illustrated, various embodiments of the present subject matter may also include another number of appliances.

In addition, it should be appreciated that system of appliances 100 may include one or more external devices, e.g., devices that are separate from or external to the one or more appliances, and which may be configured for facilitating communications with various appliances or other devices. For example, according to exemplary embodiments of the present subject matter, the system of appliances 100 may include or be communicatively coupled with a remote user interface device 110 that may be configured to enable user interaction with some or all appliances or other devices in the system of appliances 100.

In general, remote user interface device 110 may be any suitable device separate and apart from appliances 101-105 that is configured to provide and/or receive communications, information, data, or commands from a user. In this regard, remote user interface device 110 may be an additional user interface to the user interface panels of the various appliances within the system of appliances 100. In this regard, for example, the user interface device 110 may be a personal phone, a smartphone, a tablet, a laptop or personal computer, a wearable device, a smart home system, or another mobile or remote device. For example, the separate device may be a smartphone operable to store and run applications, also known as "apps," and the remote user interface device 110 be provided as a smartphone app.

In addition, as will be described in more detail below, some or all of the system of appliances 100 may include or be communicatively coupled with a remote server 112 that may be in operative communication with remote user interface device 110 and/or some or all appliances within system of appliances 100. Thus, user interface device 110 and/or remote server 112 may refer to one or more devices that are not considered household appliances as used herein. In addition, devices such as a personal computer, router, network devices, and other similar devices whose primary functions are network communication and/or data processing are not considered household appliances as used herein.

As illustrated, each of appliances 101-105, remote user interface device 110, or any other devices or appliances in system of appliances 100 may include or be operably coupled to a controller, identified herein generally by reference numeral 120. As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 120 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware.

Additionally, or alternatively, the instructions can be executed logically and/or virtually using separate threads on one or more processors.

For example, controller 120 may be operable to execute programming instructions or micro-control code associated with an operating cycle of an appliance. In this regard, the instructions may be software or any set of instructions that when executed by the processing device, cause the processing device to perform operations, such as running one or more software applications, displaying a user interface, receiving user input, processing user input, etc. Moreover, it should be noted that controller 120 as disclosed herein is capable of and may be operable to perform any methods, method steps, or portions of methods as disclosed herein. For example, in some embodiments, methods disclosed herein may be embodied in programming instructions stored in the memory and executed by controller 120. The memory devices may also store data that can be retrieved, manipulated, created, or stored by the one or more processors or portions of controller 120. The data can include, for instance, data to facilitate performance of methods described herein. The data can be stored locally (e.g., on controller 120) in one or more databases and/or may be split up so that the data is stored in multiple locations. In addition, or alternatively, the one or more database(s) can be connected to controller 120 through any suitable communication module, communication lines, or network(s).

As shown in FIGS. 1 and 2, some or all of appliances 101-105 may include a camera assembly, identified herein generally by reference numeral 122. In general, each camera assembly 122 may be generally positioned and configured for obtaining images of the area surrounding each respective appliance 101-105. Specifically, according to the illustrated embodiment, camera assembly 122 may include a camera mounted to an outer surface of the respective appliance 101-105, such as on a door, a cabinet, or any other suitable location. In this manner, camera assemblies 122 can take unobstructed images or video of an environment surrounding the appliances 101-105. It should be appreciated that each camera assembly 122 may include any suitable number, type, size, and configuration of camera(s) for obtaining images.

Notably, controllers 120 of appliance 101-105 may be communicatively coupled to each respective camera assembly 122. As explained in more detail below, controllers 120 may be programmed or configured for analyzing the images obtained by camera assembly 122, e.g., in order to monitor and identify hand gestures or other gestures made by a user of the appliance, and may use this information to make informed decisions regarding the operation of one or more appliances 101-105. According to still other embodiments, this analysis may be performed at remote server 112.

Referring still to FIGS. 1 and 2, a schematic diagram of an external communication system 130 will be described according to an exemplary embodiment of the present subject matter. In general, external communication system 130 is configured for permitting interaction, data transfer, and other communications between and among appliances 101-105, remote user interface device 110, remote server 112, other appliances within system of appliances 100, and/or one or more external devices. For example, this communication may be used to provide and receive operating parameters, cycle settings, user instructions or notifications, performance characteristics, user preferences, or any other suitable information for improved performance of one or more appliances within system of appliances 100. In addition, it should be appreciated that external communication system 130 may be used to transfer data or other information to improve performance of one or more external devices or appliances and/or improve user interaction with such devices.

In addition, remote server 112 may be in communication with an appliance and/or remote user interface device 110 through a network 132. In this regard, for example, remote server 112 may be a cloud-based server 112, and is thus located at a distant location, such as in a separate state, country, etc. According to an exemplary embodiment, remote user interface device 110 may communicate with a remote server 112 over network 132, such as the Internet, to transmit/receive data or information, provide user inputs, receive user notifications or instructions, interact with or control the appliance, etc. In addition, remote user interface device 110 and remote server 112 may communicate with the appliance to communicate similar information.

In general, communication between an appliance, remote user interface device 110, remote server 112, and/or other user devices or appliances may be carried using any type of wired or wireless connection and using any suitable type of communication network, non-limiting examples of which are provided below. For example, remote user interface device 110 may be in direct or indirect communication with the appliance through any suitable wired or wireless communication connections or interfaces, such as network 132. For example, network 132 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 130 is described herein according to an exemplary embodiment of the present subject matter. However, it should be appreciated that the exemplary functions and configurations of external communication system 130 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Now that the construction of system of appliances 100 and external communication system 130 have been presented according to exemplary embodiments, an exemplary method 200 of using hand gestures to operate appliances will be described. Although the discussion below refers to the exemplary method 200 with respect to system of appliances 100, one skilled in the art will appreciate that the exemplary method 200 is applicable to any other suitable number, type, and configuration of appliances and networks. In exemplary embodiments, the various method steps as disclosed herein may be performed by remote server 112, one or more controllers (e.g., such as controllers 120) or by a separate, dedicated controller that may be located locally on one or more of the appliances, remotely on a remote server, etc.

Figure 3:
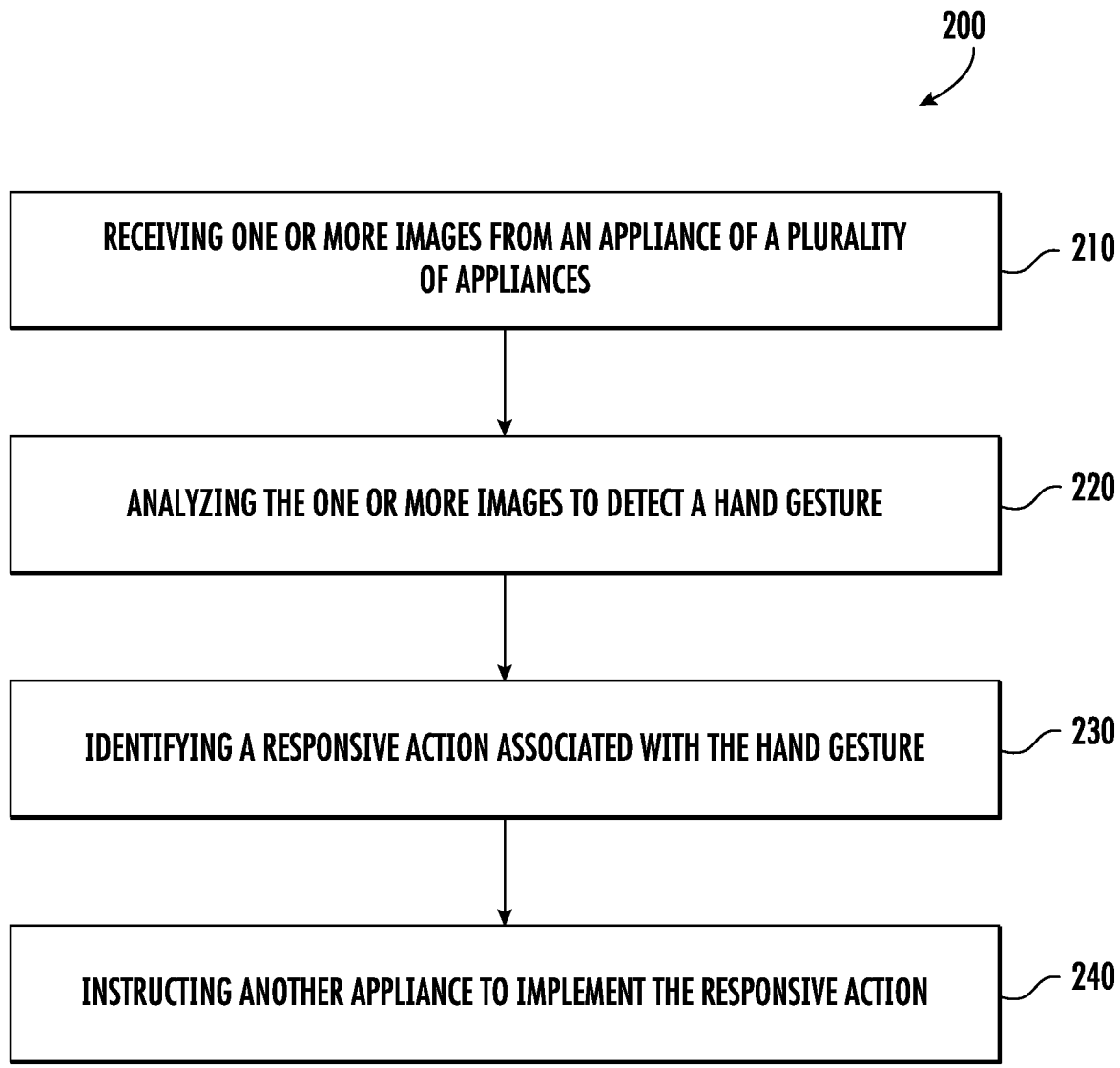
FIG. 3 illustrates a method for using a remote server to operate an appliance using hand gestures according to an example embodiment of the present subject matter.

Specifically, FIG. 3 depicts a method of using a remote server to operate an appliance using hand gestures. Specifically, step 210 includes receiving one or more images from an appliance of a plurality of appliances. In this regard, continuing the example from above, some or all of appliances 101-105 may be in operative communication with each other and/or remote server 112, e.g., via network 132. For example, appliances 101-105 may all be located within a single household and may be connected through a Wi-Fi network (or through a short-range wireless technology such as Bluetooth). One or more camera assemblies 122 located on one or more of the appliances 101-105 may be used to obtain the images of the environment surrounding the respective appliances 101-105. According to one example embodiment, these images may be transmitted to remote server 112 for analysis. According to another example embodiment, these images may be analyzed locally, e.g., by the controller 120 of one or more appliances 101-105. Each of these embodiments are described herein.

Although the term "image" is used herein, it should be appreciated that according to exemplary embodiments, camera assemblies 122 may take any suitable number or sequence of two-dimensional images, videos, or other visual representations of the area surrounding appliances 101-105. For example, the one or more images may include a video feed or series of sequential static images obtained by camera assemblies 122 that may be transmitted to the controller 120 (e.g., as a data signal) for analysis or other manipulation. These obtained images may vary in number, frequency, angle, field-of-view, resolution, detail, etc.

Specifically, step 220 may include analyzing the one or more images to detect a hand gesture. In this regard, remote server 112 may be programmed for performing image analysis in order to identify the hands of a user of the appliances 101-105, and more particularly, to identify gestures based on the position and orientation of the hand, fingers, etc.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor for and gestures. It should be appreciated that this image analysis or processing may be performed locally (e.g., by controller 120) or remotely (e.g., by offloading image data to a remote server or network).

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. Similarities and/or differences between the reference image and the obtained image may be used to extract useful information for improving appliance performance.

According to exemplary embodiments, image processing may include blur detection algorithms that are generally intended to compute, measure, or otherwise determine the amount of blur in an image. For example, these blur detection algorithms may rely on focus measure operators, the Fast Fourier Transform along with examination of the frequency distributions, determining the variance of a Laplacian operator, or any other methods of blur detection known by those having ordinary skill in the art. In addition, or alternatively, the image processing algorithms may use other suitable techniques for recognizing or identifying items or objects, such as edge matching or detection, divide-and-conquer searching, greyscale matching, histograms of receptive field responses, or another suitable routine (e.g., executed at the controller 120 based on one or more captured images from one or more cameras). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking. R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information-image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models. According to exemplary embodiments, it should be appreciated that the machine learning models may include supervised and/or unsupervised models and methods. In this regard, for example, supervised machine learning methods (e.g., such as targeted machine learning) may help identify problems, anomalies, or other occurrences which have been identified and trained into the model. By contrast, unsupervised machine learning methods may be used to detect clusters of potential failures, similarities among data, event patterns, abnormal concentrations of a phenomenon, etc.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

Step 230 may generally include identifying a responsive action associated with the hand gesture (e.g., as identified at step 220). In general, the responsive action may include any suitable operating parameter adjustments, cycle initiations, or any other modification of the operation of appliances 101-105. For example, the responsive action may include adjusting a cycle type, cycle settings, or other operating parameters. Using the dishwasher appliance 101 as an example, if the dissected hand gesture is a thumbs up, the responsive action may include commencing an operating cycle, e.g., such as an auto-wash cycle. By contrast, if the detected hand gesture is an "ok" symbol, the responsive action may include leaving a "clean dishes" indicator on. For example, a user may remove a dish from a clean dishwasher and may wish to have the clean dish indicator remain on so that other users do reload with dirty dishes. By making the ok symbol with their hand, the user indicates to the appliance that the indicator should be left on. It should be appreciated that the gestures and responsive actions described herein are only exemplary and are not intended to limit the scope of the present subject matter in any manner.

Step 240 generally includes instructing another appliance to implement the responsive action. In this regard, according to an example embodiment of the present subject matter, dishwasher appliance 101 may not include a camera assembly 122. Accordingly, dishwasher appliance 101 may be unable to directly detect hand gestures made around the appliance. However, aspects of the present subject matter are directed to the use of other appliances in the vicinity of dishwasher appliance 100 which may perform the hand gesture detection for the benefit of the dishwasher appliance 101. For example, appliances 102-105 may all include camera assemblies 122 that may obtain images to facilitate gesture detection. Notably, this method eliminates the need for additional hardware investments for the dishwasher appliance 101, e.g., the addition of camera assembly 122, and eliminates the need for more processing power to analyze image data.

Specifically, according to this example embodiment, each of the plurality of appliances 101-105 may be connected to remote server 112 through network 132. One or more images may be provided from at least two of the plurality of appliances 102-105 to facilitate improved gesture detection. In this regard, by using camera assemblies 122 from different appliances, images of the hand gestures may be obtained from multiple different angles or different distances to facilitate improved analysis and improved confidence in the identification of any particular hand gesture.

Notably, it may be desirable to obtain images and identify gestures only within a predetermined time after user interaction with the target appliance. For example, images may be obtained immediately after a user has interacted with the target appliance, e.g., such as dishwasher appliance 101. In this manner, any gesture made by the user is more likely to have been intended as a control command based on their interaction with the appliance. In this regard, method 200 may include detecting a user action with a target appliance or a first appliance of a system of appliances and obtaining the one or more images within a predetermined time after detecting the user interaction. For example, the predetermined time may be 5 minutes, 2 minutes, 1 minute, 30 seconds, 10 seconds, or less. In addition, it should be appreciated that the user interaction may be detected in any suitable manner. For example, user interaction may include detecting that a door of the appliance has been closed, e.g., via a door sensor. Alternatively, user interaction with user interface panel may be detected, proximity sensors may be used, etc.

Accordingly, method 200 may include using the benefit of camera assemblies of appliances to better identify gestures intended to control operation of one or more appliances. In this regard, for example, if a user closes the door of dishwasher appliance 101, controller 120 of dishwasher appliance 101 may communicate this interaction with appliances 102-105 through a local network. Upon receiving notice of such interaction, camera assemblies 122 of appliances 101-105 may obtain one or more images within the predetermined amount of time after the user interaction. According to example embodiments, these one or more images may be transmitted through network 132 to remote server 112. The remote server 112 may then analyze all the images collectively and/or independently to identify hand gestures made within the vicinity of dishwasher appliance 101. In this manner, a user may use hand gestures to manipulate operation of dishwasher appliance 101. Notably, these hand gestures may be programmed by the manufacturer, by the user of dishwasher appliance, or may be set in any other suitable manner. In addition, the hand gestures may be customizable to a particular user, based on a particular time of day the gesture is made, etc.

According to another exemplary embodiment, dishwasher appliance 101 may include an embedded camera assembly 122 that may be used to facilitate local, offline hand gesture detection. The use of a near-range camera according to this embodiment may enable precise focus on the user's gestures while reducing background noise, resulting in an improved overall user experience. In addition, such a near-range camera reduces the likelihood of inadvertent hand gesture recognition and appliance activation. According to this example embodiment, camera assembly 122 may include a fixed focus range that is limited in order to prevent erroneous detection of hand gestures. For example, the fixed focus range may be less than 4 feet, less than 2 feet, less than 1 foot, less than 8 inches, or about 6 inches.

According to such an embodiment, dishwasher appliance 101 need not be in operative communication with remote server 112 or any of the other appliances 102-104. Indeed, according to this example embodiment, controller 120 of dishwasher appliance 101 may be configured to perform all of the steps described herein. Specifically, controller 120 may obtain one or more images using camera assembly 122 after detecting user interaction with the appliance (e.g., within 1 minute of a door closing). Controller 120 may analyze the one or more images to detect a hand gesture, may associate that hand gesture with a responsive action, and may implement that responsive action.

Whether the hand gesture detection is performed in the cloud (e.g., by remote server 112) or locally (e.g., by controller 120 of dishwasher appliance 101), gesture detection training may be desirable to generate a catalog of applicable gestures and corresponding control actions. For example, to enable accurate detection of hand gestures, a computing system (e.g., controller 120 or remote server 112) may undergo a thorough training process. For example, if dishwasher appliance 101 is performing the analysis and method steps, this training process may include collecting a dataset of hand gesture images through the near-range camera, which is then preprocessed by the dishwasher's controller 120. The next step may involve defining a suitable machine learning model and the model may be trained using the preprocessed data. Accuracy of the model and gesture detection performance may then be assessed using a separate dataset. After successful validation, the detection program may be completed, enabling it to detect hand gestures accurately.

Notably, if cloud-based gesture detection is being implemented, once the cloud-based gesture detection and mapping process has been developed, an offline version may be downloaded onto the appliances 102-105 that are connected to dishwasher appliance 101. With this offline model in place, appliances 102-105 can recognize a specific gesture, translate it into the associated command, and issue commands to dishwasher appliance 101 directly over a local wireless network such as Wi-Fi or Bluetooth. This may be particularly beneficial to ensure the smooth operation of dishwasher appliance 101, e.g., by being prepared for potential cloud disconnections and maintaining constant functionality.

FIG. 3 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of this method are explained using appliances 101-105 and remote server 112 as an example, it should be appreciated that this method may be applied to operating any suitable appliance or system of appliances using hand gestures.

As explained herein, aspects of the present subject matter are generally directed to an off-line or non-networked dishwasher with a close-range camera that may be used to detect hand gestures to facilitate appliance operation. The embedded close-range camera may operate the dishwasher by detecting hand gestures in a pre-set focus range or a user adjusted range. The close-range camera enables precise focus on the user's gestures while minimizing background noise. Distinct hand gestures are assigned to varying dishwasher cycles, options and controls, such as the "thumbs up" gesture that activates the Auto Wash Cycle and the "ok" gesture that controls clean/dirty status light. This allows users to keep the status light to "CLEAN" through a simple gesture when they only need to briefly open the door and remove a few clean items from the load. A suitable machine learning model may process the detected data for accurate hand gestures detection. The detection of gestures may occur within a predetermined time, e.g., within one minute, of closing the dishwasher door to avoid inadvertent activation (accidental activation of the dishwasher).

As explained herein, alternative aspects of the present subject matter are generally directed to a cloud-based system that enables a dishwasher to be operated using hand gestures detected by nearby connected devices, such as a refrigerator, kitchen lighting, etc. The system allows each family member to select a unique, customized hand gesture for the same cycle ("thumbs up" or "V" sign gesture to activate the "Auto Wash Cycle") that enables greater personalization and ease of use in the household. The system may only monitor user's gestures within a predetermined time, e.g., 1 minute, of closing the dishwasher door to avoid inadvertent activation (accidental activation of the dishwasher). Once the cloud-based gesture detection and mapping process is developed, an offline version may be downloaded onto the dishwasher, and other related connected devices. With this version in place, the device may recognize a specific gesture, translate it, and issue commands to the dishwasher directly over a local wireless network such as Wi-Fi or Bluetooth. The offline version may be useful in situations where either the dishwasher or the device is disconnected from the cloud.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of using a remote server to operate a first appliance of a plurality of appliances, the method comprising:
   receiving one or more images from a second appliance of the plurality of appliances;
   analyzing the one or more images to detect a hand gesture, wherein the hand gesture is an ok symbol;
   identifying a responsive action associated with the hand gesture, wherein the responsive action is leaving a clean indicator on; and
   instructing the first appliance to implement the responsive action.

2. The method of claim 1, wherein each of the plurality of appliances are connected to the remote server through an external network.

3. The method of claim 1, wherein the one or more images are provided from at least two appliances of the plurality of appliances.

4. The method of claim 1, wherein the first appliance is a dishwasher appliance.

5. The method of claim 1, further comprising:
   detecting user interaction with the first appliance; and
   obtaining the one or more images within a predetermined time after detecting the user interaction.

6. The method of claim 5, wherein the predetermined time is less than one minute.

7. The method of claim 5, wherein the first appliance comprises a door and detecting the user interaction with the first appliance comprises determining that the door has been opened or closed.

8. The method of claim 1, wherein analyzing the one or more images to detect the hand gesture comprises using a machine learning image recognition process comprising at least one of a convolution neural network ("CNN"), a region-based convolution neural network ("R-CNN"), a deep belief network ("DBN"), or a deep neural network ("DNN") image recognition process.

9. The method of claim 1, wherein the responsive action comprises:
   adjusting a cycle type, a cycle setting, or other operating parameters.

10. The method of claim 1, wherein the hand gesture is a thumbs up and the responsive action is commencing an operating cycle.

11. The method of claim 1, wherein the hand gesture is an ok symbol and the responsive action is leaving a clean indicator on.

12. A method for operating an appliance, the method comprising:
    obtaining one or more images using a camera assembly;
    analyzing the one or more images to detect a hand gesture, wherein the hand gesture is an ok symbol;
    identifying a responsive action associated with the hand gesture, wherein the responsive action is leaving a clean indicator on; and
    implementing the responsive action using the appliance.

13. The method of claim 12, wherein the camera assembly is mounted on an outside surface of a cabinet of the appliance for obtaining the one of more images.

14. The method of claim 12, wherein the camera assembly comprises a fixed focus range of less than 2 feet.

15. The method of claim 14, wherein the fixed focus range is between about 4 inches and 8 inches.

16. The method of claim 12, wherein the appliance is a first appliance of a plurality of appliances connected to a local network, and wherein the camera assembly is mounted on a second appliance of the plurality of appliances for obtaining the one of more images.

17. The method of claim 16, wherein the one or more images are provided from at least two appliances of the plurality of appliances.

18. The method of claim 12, wherein the appliance is a dishwasher appliance.

19. The method of claim 12, further comprising:
    detecting user interaction with the appliance; and
    obtaining the one or more images within a predetermined time after detecting the user interaction.

20. The method of claim 12, wherein analyzing the one or more images to detect the hand gesture comprises using a machine learning image recognition process comprising at least one of a convolution neural network ("CNN"), a region-based convolution neural network ("R-CNN"), a deep belief network ("DBN"), or a deep neural network ("DNN") image recognition process.

* * * * *